(12) United States Patent
Prampolini et al.

(10) Patent No.: US 9,079,661 B2
(45) Date of Patent: Jul. 14, 2015

(54) ULTRA-RAPID AIR VEHICLE AND RELATED METHOD FOR AERIAL LOCOMOTION

(75) Inventors: Marco Prampolini, Chambourcy (FR); Yohann Coraboeuf, Mérignac (FR)

(73) Assignees: ASTRIUM SAS, Paris (FR); EUROPEAN AERONAUTIC DEFENCE AND SPACE COMPANY—EADS FRANCE, Paris (FR)

( * ) Notice: Subject to any disclaimer, the term of this patent is extended or adjusted under 35 U.S.C. 154(b) by 352 days.

(21) Appl. No.: 13/516,878

(22) PCT Filed: Dec. 20, 2010

(86) PCT No.: PCT/EP2010/070189
§ 371 (c)(1),
(2), (4) Date: Aug. 29, 2012

(87) PCT Pub. No.: WO2011/076706
PCT Pub. Date: Jun. 30, 2011

(65) Prior Publication Data
US 2012/0325957 A1    Dec. 27, 2012

(30) Foreign Application Priority Data
Dec. 22, 2009    (FR) ..................... 09 59366

(51) Int. Cl.
*B64C 30/00* (2006.01)
*B64D 27/20* (2006.01)
*B64C 3/10* (2006.01)
*B64C 5/08* (2006.01)

(Continued)

(52) U.S. Cl.
CPC . *B64C 30/00* (2013.01); *B64C 3/10* (2013.01); *B64C 5/08* (2013.01); *B64C 5/10* (2013.01); *B64C 23/065* (2013.01); *B64D 27/20* (2013.01); *B64D 2027/026* (2013.01); *B64G 1/14* (2013.01); *Y02T 50/12* (2013.01); *Y02T 50/164* (2013.01)

(58) Field of Classification Search
USPC ............... 244/2, 13, 15, 36, 46, 73 R, 87, 91, 244/158.9, 171.1, 171.3, 171.4
See application file for complete search history.

(56) References Cited

U.S. PATENT DOCUMENTS 2,944,764 A    7/1960    Lane et al.
3,076,625 A *  2/1963    Griffith ..................... 244/117 A (Continued)

FOREIGN PATENT DOCUMENTS

DE    2136129 A1    2/1973

OTHER PUBLICATIONS

International Search Report for PCT/EP2010/070189; Jun. 4, 2011.

*Primary Examiner* — Tien Dinh
*Assistant Examiner* — Michael A Fabula
(74) *Attorney, Agent, or Firm* — Pearne & Gordon LLP (57) ABSTRACT

The invention concerns an ultra-rapid air vehicle together with a method of aerial locomotion by means of an ultra-rapid air vehicle, where the air vehicle is propelled by a system of motors formed of turbojets (TB1, TB2), ramjets (ST1, ST2) and a rocket motor which can be made streamlined to reduce the drag of the base during the cruise phase, and where the vehicle has a gothic delta wing (A) fitted with moving fins (a1, a2) at both outer ends of the trailing edge of the delta wing (A).

13 Claims, 9 Drawing Sheets

(51) Int. Cl.
    *B64C 5/10*        (2006.01)
    *B64C 23/06*      (2006.01)
    *B64G 1/14*        (2006.01)
    *B64D 27/02*      (2006.01)

(56) References Cited

U.S. PATENT DOCUMENTS

| | | | |
|---|---|---|---|
| 3,093,348 A | | 6/1963 | Schelp et al. |
| 3,146,971 A | * | 9/1964 | Walker et al. ............... 244/15 |
| 3,432,125 A | * | 3/1969 | Schroeder, Jr. ............. 244/130 |
| 3,672,606 A | * | 6/1972 | Walley ...................... 244/171.4 |
| 4,247,062 A | * | 1/1981 | Brueckner .................... 244/91 |
| 4,538,779 A | | 9/1985 | Goldstein |
| 4,802,639 A | * | 2/1989 | Hardy et al. .................. 244/2 |
| 4,817,890 A | * | 4/1989 | Coffinberry ............ 244/135 R |
| 4,828,204 A | * | 5/1989 | Friebel ........................ 244/15 |
| 5,295,642 A | * | 3/1994 | Palmer ......................... 244/2 |
| 5,402,965 A | * | 4/1995 | Cervisi et al. ................ 244/2 |
| 5,529,263 A | * | 6/1996 | Rudolph ...................... 244/55 |
| 6,193,187 B1 | * | 2/2001 | Scott et al. ................... 244/2 |
| 6,612,522 B1 | * | 9/2003 | Aldrin et al. ................. 244/2 |
| 6,616,092 B1 | * | 9/2003 | Barnes et al. ................. 244/2 |
| 6,938,854 B2 | * | 9/2005 | Nelson ....................... 244/120 |
| 7,549,604 B2 | * | 6/2009 | Hutterer ....................... 244/54 |
| 7,762,077 B2 | * | 7/2010 | Pederson et al. .............. 60/767 |
| 8,500,070 B2 | * | 8/2013 | Im ............................ 244/159.3 |
| 8,702,041 B2 | * | 4/2014 | Chavagnac et al. ...... 244/158.9 |
| 2002/0096598 A1 | * | 7/2002 | Nelson ......................... 244/15 |
| 2003/0052232 A1 | * | 3/2003 | Hall ........................... 244/172 |
| 2003/0102408 A1 | * | 6/2003 | Casillas et al. ............. 244/172 |
| 2004/0016845 A1 | * | 1/2004 | Nelson ...................... 244/45 A |
| 2004/0217231 A1 | * | 11/2004 | D' Auvergne ................ 244/63 |
| 2008/0128547 A1 | * | 6/2008 | Pederson et al. .............. 244/55 |
| 2008/0283677 A1 | * | 11/2008 | Pederson et al. ........... 244/73 R |
| 2010/0276545 A1 | * | 11/2010 | Chavagnac et al. ...... 244/158.9 |
| 2010/0327108 A1 | * | 12/2010 | Prampolini ................ 244/3.24 |
| 2014/0014779 A1 | * | 1/2014 | Salkeld ..................... 244/159.3 |
| 2014/0110530 A1 | * | 4/2014 | Chavagnac et al. ...... 244/158.5 |

\* cited by examiner

ULTRA-RAPID AIR VEHICLE AND RELATED METHOD FOR AERIAL LOCOMOTION

TECHNICAL FIELD AND PRIOR ART

The invention concerns an ultra-rapid air vehicle and a method for aerial locomotion using an air vehicle in accordance with the air vehicle of the invention.

Studies on the theme of point-to-point ultra-rapid transport have recently been undertaken in Japan and the United States. Following on from these initiatives, EADS and ASTRIUM have also undertaken, alongside the ASP ("ASTRIUM SPACE PLANE") programme, concept studies for a point-to-point ultra-rapid air vehicle.

At the current time, the point-to-point ultra-rapid air vehicles which have been produced are the CONCORDE and Tupolev Tu-144 aircraft, both of which are supersonic. The ultra-rapid air vehicle proposed by the present invention enables the performance of both these aircraft to be improved very considerably.

In particular, the air vehicle proposed by the present invention substantially reduces the noise emitted when the sound barrier is broken, also called the supersonic "bang"; this noise has been the main limit, if not the only one, preventing the opening of lines other than transatlantic ones for the CONCORDE aircraft.

Account of the Invention

The invention relates to an air vehicle including a fuselage, a gothic delta wing positioned either side of the fuselage, and a system of motors able to propel the air vehicle. The air vehicle is characterised in that:

The fuselage contains a tank of hydrogen which is liquid or in the state of melted snow (slush), and one or more liquid oxygen tanks;

The gothic delta wing has a flat upper surface and a flat lower surface, and the wing root starts roughly in the area where the forward part of the fuselage broadens;

A fin is attached to each outer end of the trailing edge of the delta wing using a cylindrical part the axis of which is parallel to the axis of the fuselage, where each fin consists of two roughly identical trapezoid-shaped elements attached to the cylindrical part and located in the same plane, either side of the cylindrical part, where each cylindrical part is able to rotate around its axis such that both trapezoid-shaped elements which are attached to the cylindrical part are positioned either in a plane parallel to the plane of the gothic delta wing, or in a plane perpendicular to the gothic delta wing; and The system of motors includes at least one turbojet able to be retracted into the fuselage, and positioned in a forward portion of the fuselage, at least one fixed-geometry ramjet, and one rocket motor positioned in a rear part of the fuselage, where a door located in the rear part of the fuselage is able to be opened or closed, respectively to expose the rocket motor to the exterior, or to isolate the rocket motor from the exterior.

According to an additional characteristic of the invention, the fuselage consists of a front segment or nose, which extends a cabin segment, and of a rear segment, where the forward segment is of a constant section which gradually broadens from the cabin section, and where the rear section is of a constant section which gradually narrows towards the rear of the vehicle.

According to another additional characteristic of the invention, the centre of gravity of each liquid oxygen tank is positioned, whether empty or full, as close as possible to the centre of gravity of the air vehicle.

According to yet another additional characteristic of the invention, the rocket motor consists either of a single motor, or of a main motor accompanied by one or more auxiliary motors.

According to yet another additional characteristic of the invention, the vehicle has a leading edge sweep of roughly between 70° and 75°, calculated in reference to a straight delta wing.

The invention also concerns a method for aerial locomotion using an air vehicle in accordance with the invention, where the method includes a phase of takeoff of the vehicle, characterised in that the takeoff phase includes the following steps:

a step of taxiing of the vehicle on the ground, during which the vehicle is propelled by the turbojets to reach a point of alignment on a runway, where both trapezoid-shaped elements of both fins are positioned in a plane parallel to the gothic delta wing in preparation for takeoff;

a step of opening or of verification of a state of opening of the vehicle's rear door;

a step of takeoff, during which the air vehicle is propelled simultaneously by the turbojet or turbojets, and by the rocket motor, where the vehicle is gradually brought into a phase of near-vertical ascendant flight through the use of a very substantial thrust deployed by the rocket motor, such that the vehicle reaches and exceeds MACH 1 during the ascendant flight phase, where the turbojet or turbojets are shut down and withdrawn into the fuselage before the MACH 1 speed is reached, and where the positions of both trapezoid-shaped elements of both fins of the air vehicle are gradually brought into a plane perpendicular to the plane of the gothic delta wing as soon as the vehicle reaches and/or exceeds MACH 1 speed.

The invention also concerns a method for aerial locomotion using an air vehicle in accordance with the invention, where the method includes a phase of landing of the vehicle from a cruising flight corridor in which the vehicle is propelled by a thrust of the ramjet or ramjets, where the positions of both trapezoid-shaped elements of both fins are brought into a plane perpendicular to the gothic delta wing, characterised in that the vehicle's landing phase includes the following steps:

shutdown of the ramjet or ramjets;

gradual deployment of split flaps which bring the vehicle into a descent phase in a steep gradient with a reducing transonic near-vertical speed;

gradual modification of the position of both trapezoid-shaped elements of both fins so as to position the said elements in a plane parallel to the plane of the gothic delta wing, after the speed of the vehicle reaches and/or becomes less than MACH 1 speed;

gradual closure of the split flaps and deployment and ignition of the turbojet or turbojets, after the speed of the vehicle becomes less than MACH 1; and insertion of the vehicle into standard air traffic.

According to yet another additional characteristic of the invention, the cruising flight is characterised by:

An altitude of the aircraft relative to the ground of roughly between 30000 m and 35000 m;

A dissipation distance of the shockwave of the vehicle's nose of roughly between 110 km and 175 km;

A speed of the aircraft of roughly between Mach 4 and Mach 4.5; and

An aperture angle $\alpha$ of the Mach cone of roughly between 11° and 15°.

The ultra-rapid air vehicle proposed by the invention has a speed twice that of CONCORDE, i.e. Mach 4+, and a cruising altitude at least 20 km higher than that of a conventional commercial aircraft.

In addition to these broad performance characteristics, the air vehicle of the invention advantageously enables the equivalent of 2-3 tons to be transported, i.e., for example some twenty passengers, and also offers a particularly important advantage in respect of the environmental aspect as a consequence of propulsion in the acceleration and cruise phase provided by combining oxygen, which is both on-board (liquid oxygen) and ambient, and on-board hydrogen, the fuel of the future.

The applications envisaged by the ultra-rapid air vehicle are of two kinds, namely civil and military.

In the case of civil applications, the market envisaged is principally that of business travel and VIP passengers, who require transcontinental return journeys within one day.

The military applications, for their part, relate, for example, to strategic reconnaissance, ultra-rapid transport of high added-value goods, and also equipped elite commandos. An offensive derivative of the air vehicle could carry out precision strikes and take out preferred high added-value targets, for example by high-power electromagnetic pulses, also called EMP ("Electro Magnetic Pulse"). As with satellites, the air vehicle of the invention offers total almost invulnerability to conventional antiaircraft systems, whilst having the flexibility and non-predictability of a traditional aircraft.

The performance of the air vehicle of the invention allows distances of approximately 9000 km (for example, Paris-San Francisco or Tokyo-Los Angeles) to be covered in three hours.

The operational concept and the architecture of the air vehicle of the invention allow:
operations on departure and arrival of standard airport installations, provided hydrogen and liquid oxygen refueling is available;
avoidance of interaction with general cruising air traffic (cruising altitude above the current air corridors);
operations almost in all weather, since the flight altitude is such that the meteorological phenomena which impact satisfactory flying are nonexistent;
maintenance of an aeronautical nature throughout the vehicle, except for the rocket motor system, which requires specific operations.

BRIEF DESCRIPTION OF THE FIGURES

Other characteristics and advantages of the invention will appear in the light of a preferential embodiment made in reference to the attached figures, among which.

In all the figures the same references designate the same elements. Magnitudes $l$ represent distances. Magnitudes $\Phi$ represent diameters. Magnitudes $\theta$ represent angles. Magnitudes R represent radii of curvature.

DETAILED ACCOUNT OF PREFERRED
EMBODIMENTS OF THE INVENTION

Figure 1:
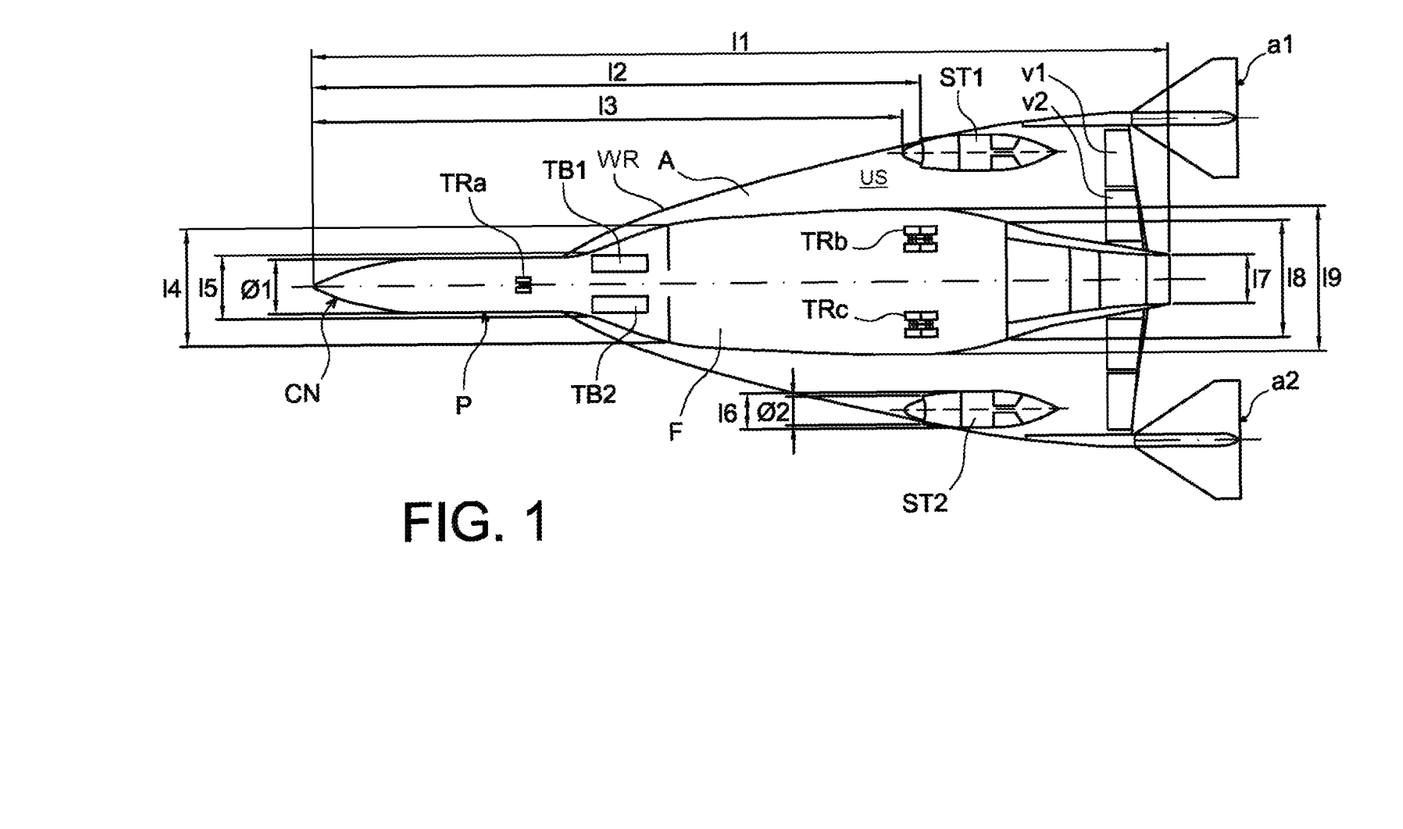
FIG. 1 represents a view from beneath of an ultra-rapid air vehicle according to the invention.

FIG. 1 represents a view from beneath of an example of an ultra-rapid air vehicle according to the invention.

In FIG. 1 represented distances $l$ have the following values, as non-restrictive examples:
$l1=52995$ mm;
$l2=37855$ mm;
$l3=36524$ mm;
$l4=7135$ mm;
$l5=4394$ mm;
$l6=2150$ mm;
$l7=3000$ mm;
$l8=7115$ mm;
$l9=8929$ mm.

Similarly, represented diameters $\Phi$ have the following values, as non-restrictive examples:
$\Phi1=3500$ mm;
$\Phi2=1800$ mm.

Figure 10:
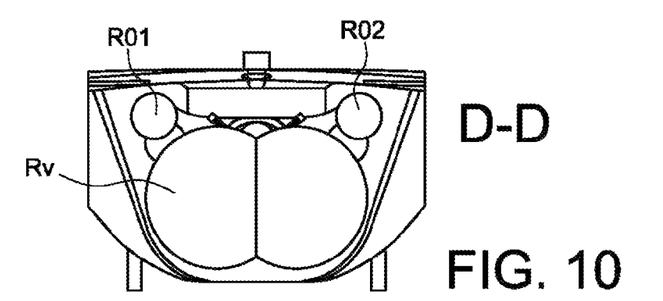
Figure 14A:
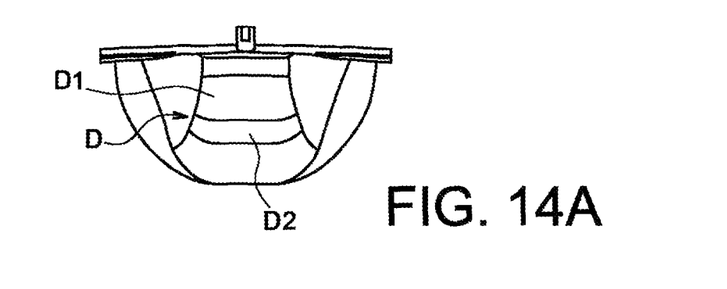
FIGS. 14A, 14B and 14C represent partial rear views of the air vehicle of the invention for different positions of a door able to expose rocket motor to the exterior, or isolate it from it.
Figure 14B:
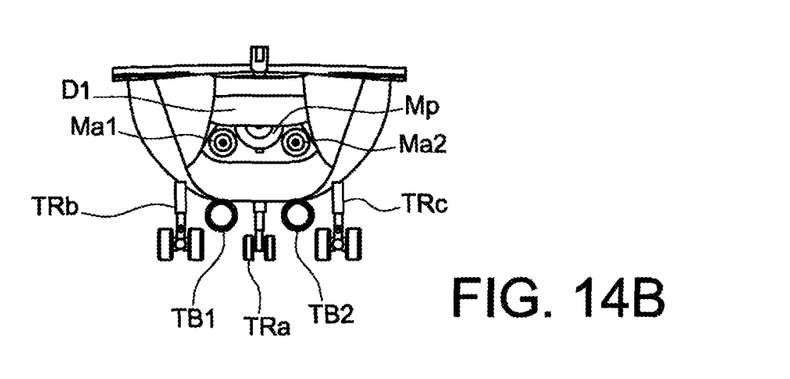
Figure 14C:
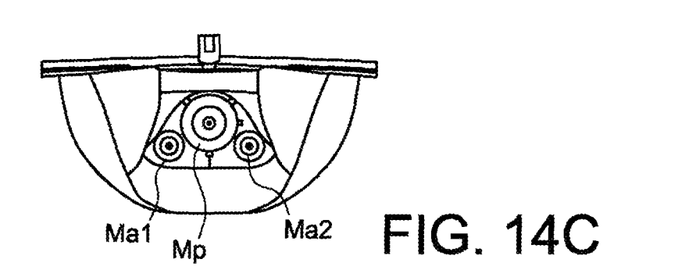

The ultra-rapid air vehicle of the invention according to the example of FIG. 1 includes all the following elements:
A fuselage F which contains a tank Rv with hydrogen which is liquid or in the state of slush (cf. FIGS. 6 and 10), and two liquid oxygen tanks RO1 and RO2, where tanks Rv, R01 and R02 are intended to supply a rocket motor Mf;
A wing A of the gothic delta type having a flat upper surface US and a flat lower surface LS, and a wing root WR which starts roughly in an area where the forward part of the fuselage F broadens, and which has at its rear end, either side of the fuselage, two rear flaps v1, v2;
A leading edge sweep of the vehicle θ3 (cf. FIG. 4) which is preferentially between 70° and 75°, calculated with reference to a straight delta wing;
A cabin P intended to contain, for example, passengers, located forward from the wing-fuselage assembly, in order to be in the wind's path during cruising flight conditions, thus enabling the contribution of this part to the vehicle's total drag to be minimised, whilst generating no lift;
A cockpit and a nose forming a CN segment built as an extension of cabin P, at the front of the vehicle;
A landing gear TRa, TRb, TRc able to be housed in the air vehicle, where the control linkage of the landing gear is preferentially simplified as far as possible;

Two moving fins a1, a2 positioned symmetrically relative to the vehicle's lengthways axis, where each fin is attached to the outer end of a trailing edge of the delta wing;

Two ramjets ST1, ST2 positioned symmetrically relative to the axis of the vehicle, where each ramjet has fixed geometry which is optimised for the cruising flight phase;

Two turbojets TB1, TB2 positioned in the transition zone between cabin P and fuselage F, and able to be brought into the fuselage when they are not operating;

A rocket motor Mf (cf. FIGS. 6, 14A, 14B) positioned to the rear of the fuselage, and able to be exposed to the exterior, or enclosed in the fuselage, by means of a rear door P of the vehicle (cf. FIGS. 14A-14C).

In the example of FIG. 1 described above, the air vehicle of the invention includes two turbojets and two ramjets. More generally, however, the invention also concerns air vehicles including at least one turbojet and at least one ramjet.

Preferentially, both ramjets ST1, ST2 have their air inlet positioned forward of the zones of the air vehicle affected by the secondary shocks and/or of the zone of the air vehicle which is affected by the head shock, thus enabling air to be admitted in an undisturbed condition.

The broadening of the front part of the fuselage advantageously generates a secondary oblique shock, which interacts strongly with the lower surface LS of the wing to generate the lift by compression, commonly called compression lift.

Figure 2:
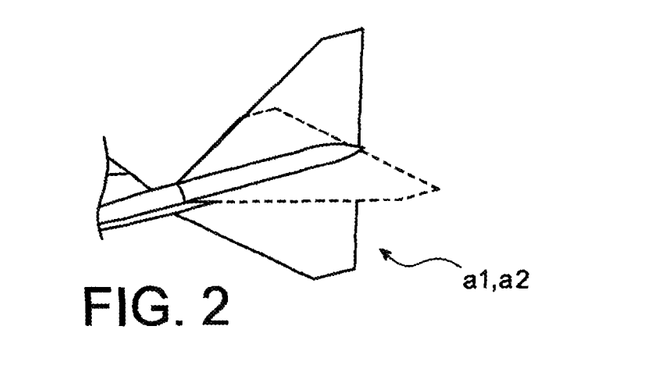
FIG. 2 represents a perspective view of a particular element of an ultra-rapid air vehicle according to the invention.

FIG. 2 represents a moving fin a1, a2 of the ultra-rapid air transport means of the invention. A moving fin consists of two roughly identical trapezoid-shaped elements located, in the same plane, either side of a cylindrical part attached to an outer end of a trailing edge of the delta wing. The axis of the central cylindrical part is parallel to the lengthways axis of the aircraft. The cylindrical part is able to rotate to position the moving fin, either to a horizontal position, at subsonic speeds, or to a vertical position, at supersonic speeds. For reasons of convenience both positions of the moving fin are represented simultaneously in FIG. 2.

Figure 3:
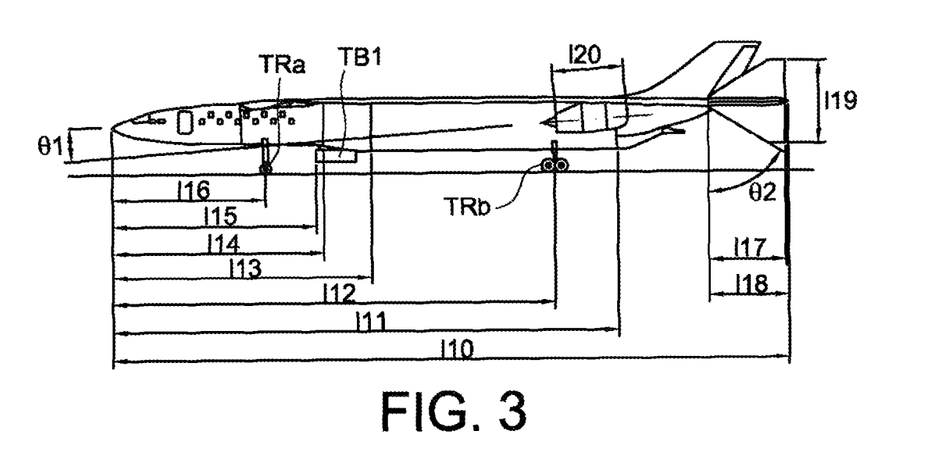
FIG. 3 represents a profile view of an ultra-rapid air vehicle according to the invention.

FIG. 3 represents a profile view of the ultra-rapid vehicle of the invention when fins a1, a2 are vertical (i.e. perpendicular to the axis of the vehicle). In FIG. 3 represented distances 1 have the following values, as non-restrictive examples:

110=57630 mm;
111=42995 mm;
112=37685 mm;
113=21995 mm;
114=17995 mm;
115=17950 mm;
116=13000 mm;
117=6780 mm;
118=6657 mm;
119=7400 mm;
120=6097 mm.

Similarly, represented angles θ1 and θ2 have the following values, as non-restrictive examples:

θ1=5°;
θ2=58°.

Figure 4:
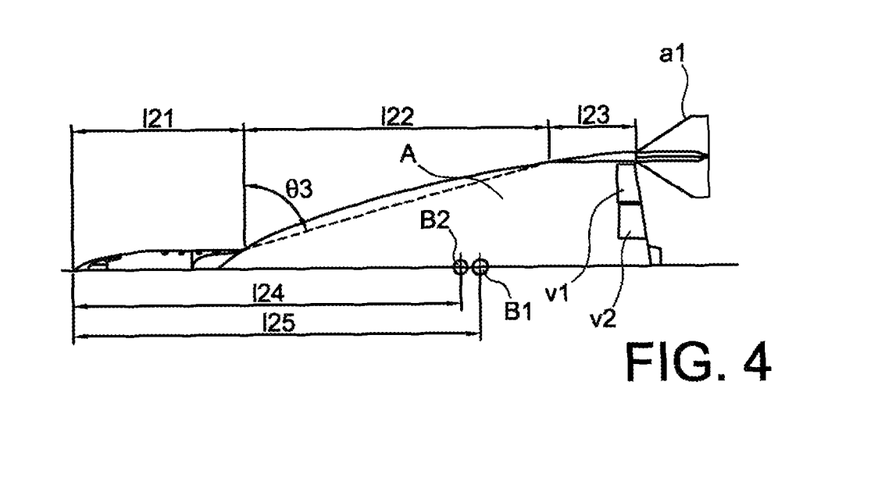
FIG. 4 represents a half-view from above of an ultra-rapid air vehicle according to the invention.

FIG. 4 represents a half-view from above of the ultra-rapid air vehicle of the invention. Represented fin a1 is in its horizontal position. References B1 and B2 indicate, respectively, the position of the center of mass of the vehicle's reference area in the subsonic configuration (with fins a1, a2 horizontal) and in the supersonic configuration (with fins a1, a2 vertical).

Distances 1 represented in FIG. 4 are, as non-restrictive examples:

121=15326 mm;
122=27878 mm;
123=7556 mm;
124=35009 mm;
125=36722 mm.

Angle θ3 (vehicle's leading edge sweep) is, as a non-restrictive example, equal to 74°.

Figure 5:
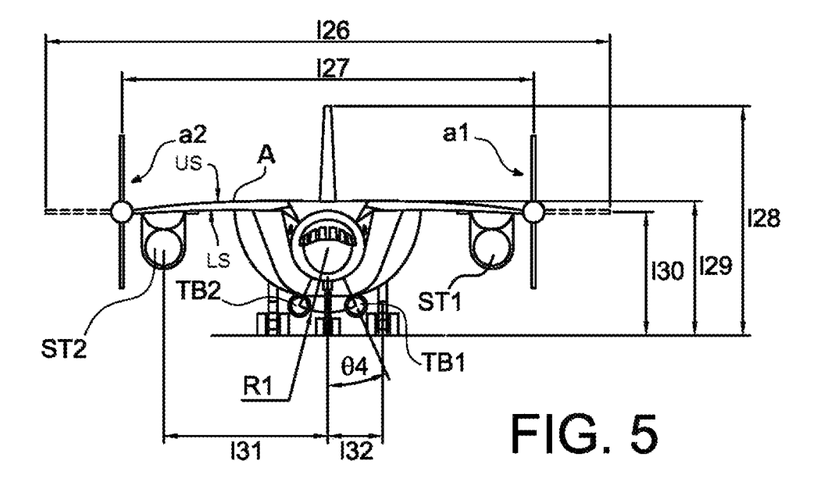
FIG. 5 represents a front view of an ultra-rapid air vehicle according to the invention.

FIG. 5 represents a front view of the ultra-rapid air vehicle of the invention.

Figure 6:
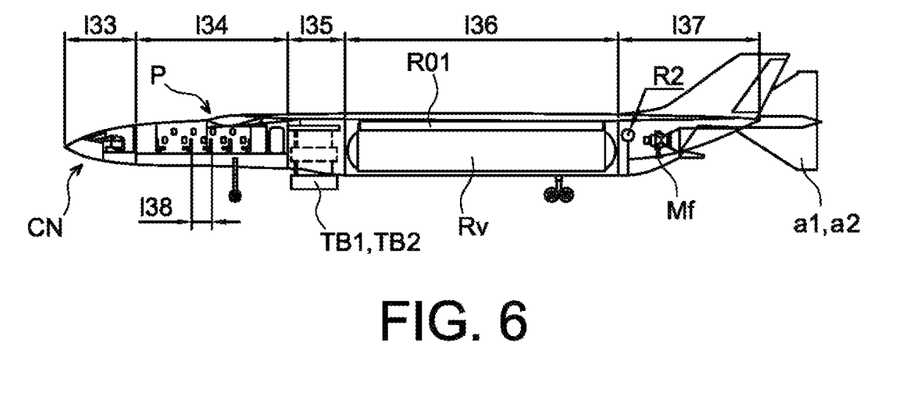
FIG. 6 represents a lengthways section view of an ultra-rapid air vehicle according to the invention.
Figure 7:
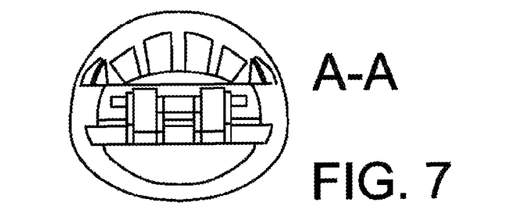
FIGS. 7-11 represent various transverse section views of the ultra-rapid air vehicle of the invention represented in FIG. 6.

Distances 1 are in this case as follows, as non-restrictive examples:

126=27188 mm;
127=19788 mm;
128=11262 mm;
129=6578 mm;
130=6037 mm;
131=7900 mm;

FIG. 6 represents a lengthways section view of the air vehicle of the invention.

Distances 1 represented in FIG. 6 are, as non-restrictive examples:

133=5495 mm;
134=11500 mm;
135=4200 mm;
136=21000 mm;
137=10800 mm;
138=1500 mm.

Radius R2 is equal to 445 mm.

FIGS. 7, 8, 9, 10 and 11 are, respectively, views of the air vehicle of the invention as transverse sections A-A (cockpit), B-B (cabin), C-C (fuselage behind the cabin, just forward of the turbojets), D-D (fuselage just rear of the turbojets, referenced TB1', TB2' for turbojets brought into the fuselage and TB1, TB2 for turbojets brought out of the fuselage) and E-E (fuselage in the area of the landing gear) of FIG. 6.

Figure 8:
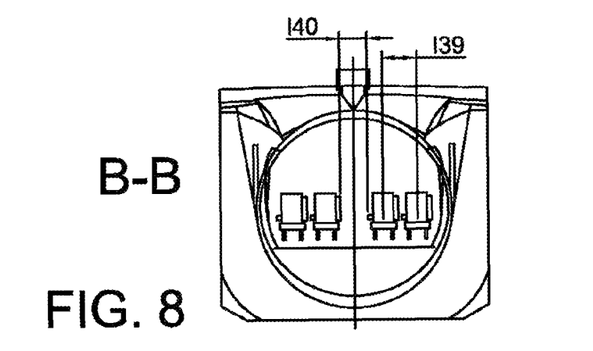
Figure 9:
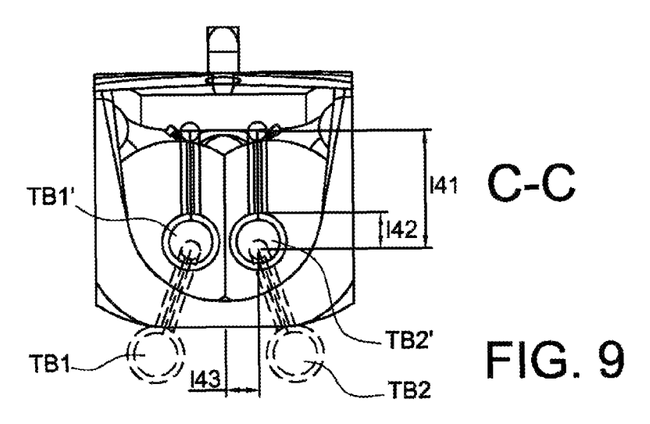
Figure 11:
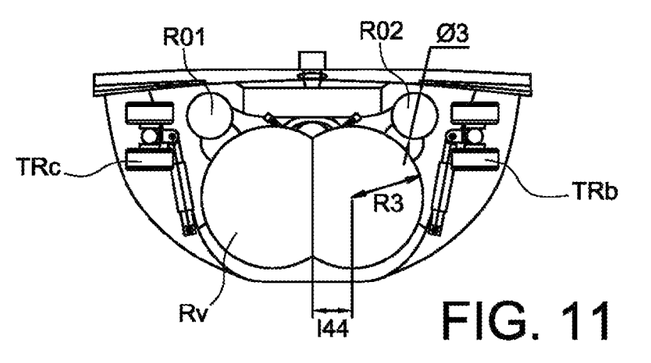

In FIG. 8, distance 139 is, for example, equal to 630 mm and distance 140 is, for example, equal to 505 mm. In FIG. 9, distance 141 is, for example, equal to 2150 mm and distances 142 and 143 are respectively equal, for example, to 650 mm and 600 mm. In FIG. 11, distance 144 is, for example, equal to 870 mm and radius R4 is, for example, equal to 1550 mm.

Figure 12:
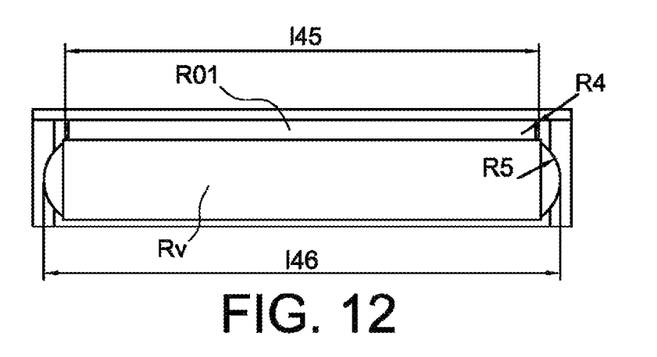
FIG. 12 represents a detailed view of the ultra-rapid air vehicle of the invention represented in FIG. 6.

FIG. 12 is a detailed view of FIG. 6, namely a lengthways section representation of hydrogen tank Rv together with, in the background, one of the two oxygen tanks RO1. Distance 145 is equal, for example, to 18805 mm and distance 146 for example to 20471 mm. Radii of curvature R4 and R5 are equal respectively to 591 mm and 1839 mm.

Figure 13:
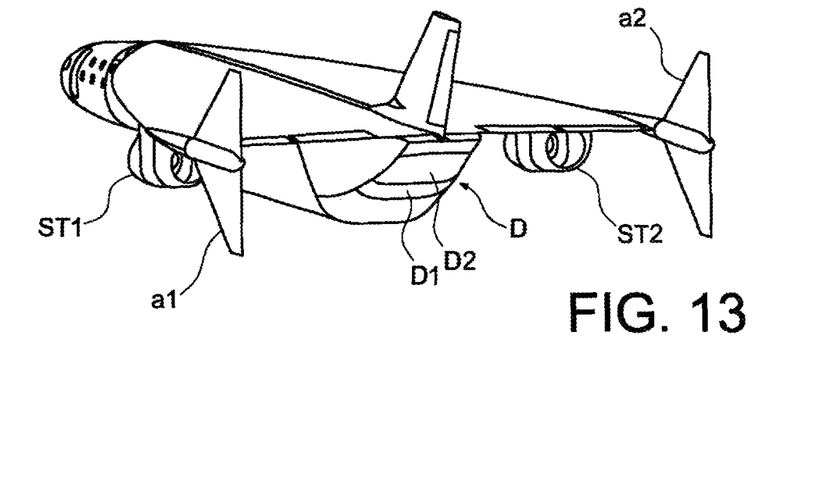
FIG. 13 represents a rear perspective view of the air vehicle of the invention.

FIG. 13 represents a rear perspective view of the air vehicle of the invention. A door D preferentially formed of two leaves D1, D2, isolates rocket motor Mf from the exterior. Rocket motor Mf consists, for example, of a main motor Mp and two auxiliary motors Ma1, Ma2 located either side of the main motor, closer to the lower portion of the fuselage than the main motor.

FIGS. 14A, 14B and 14C represent partial rear views of the air vehicle of the invention for different positions of the leaves of door D. Each of leaves D1, D2 is hinged on its own horizontal axis. FIG. 14A represents the case in which door D is closed and, as a consequence, completely isolates the rocket motor from the exterior (the case in which the rocket motor is not operating). FIG. 14B represents the case in which leaf D1 is closed and leaf D2 is open. In this case, only the auxiliary motors are exposed to the exterior, and the exposure of the main motor to the exterior is partially obstructed (the case in which the main motor is not operating and the auxiliary motors are in operation). FIG. 14C represents the case in which both leaves are open. The main motor and the auxiliary motors are exposed to the exterior (this is the case in which the main motor and the auxiliary motors are in operation). FIG.

Figure 15:
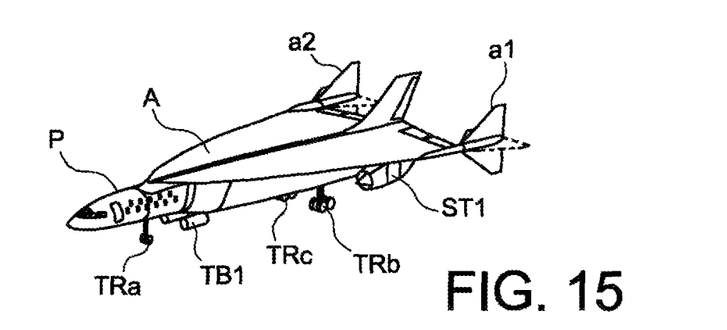
FIG. 15 represents a perspective view of an ultra-rapid air vehicle according to the invention.

15 represents, as a simple illustration, a perspective view of an ultra-rapid air vehicle according to the invention.

As is known to the man skilled in the art, during the flight of an air vehicle the centre of pressure and the centre of gravity of the air vehicle must be merged. The solution of the prior art in the case of the CONCORDE aircraft consisted in moving the aircraft's centre of gravity to achieve this condition, whatever the aircraft's speed. However, this solution is possible only if there are possibilities for moving ballast on board the aircraft. This is not the case with the air transport of the invention. The solution of the invention is to move the centre of pressure of the ultra-rapid vehicle by modifying the position of the fin in accordance with that which was mentioned above, in reference to FIG. 2.

Figure 16:
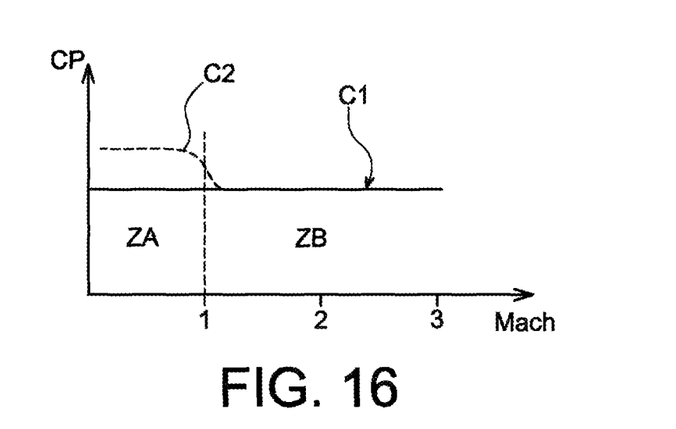
FIG. 16 represents the variation of the centre of pressure of an ultra-rapid air vehicle of the invention according to the speed given in MACH.

FIG. 16 represents the estimated variation of centre of pressure CP of the ultra-rapid air vehicle of the invention according to the speed given in Mach.

In a first zone ZA, the vehicle's speed is less than the speed of sound (Mach 1) and in a second zone ZB, the speed is greater than the speed of sound. A first curve C1 represents the variation of the centre of pressure CP in the case in which rear fins a1, a2 are horizontal in zone ZA and vertical in zone ZB. A second curve C2 represents the variation of the centre of pressure CP when there are no rear fins. Curves C1 and C2 become merged after the speed of the air vehicle is greater than Mach 1 (fins in the perpendicular plane of the delta wing). Advantageously, it appears that curve C1 has no variation of centre of pressure over the entire range of speeds. The air vehicle of the invention is therefore chosen with rear fins in accordance with the fins represented in the figures, where the position of the fins according to the speed of the air vehicle is horizontal in the case of speeds less than Mach 1 and vertical in the case of speeds greater than Mach 1.

Figure 17:
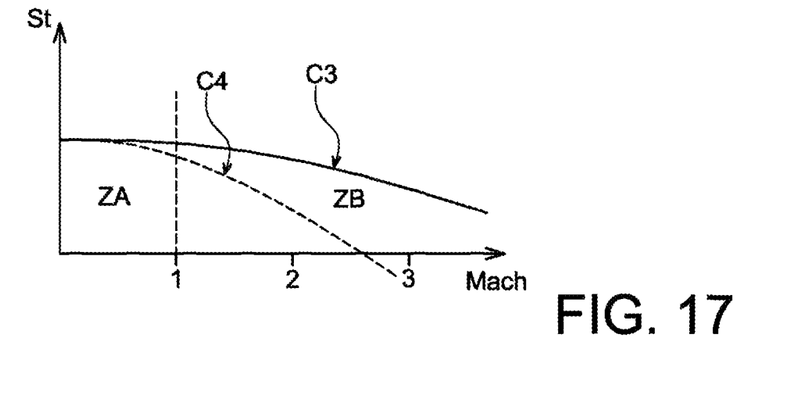
FIG. 17 represents the variation of the directional stability of an ultra-rapid air vehicle of the invention as a function of the speed given in MACH.

FIG. 17 represents the variation of directional stability St of an ultra-rapid air vehicle of the invention as a function of the speed given in Mach. The range of speeds is also divided between zones ZA and ZB defined above. A first curve C3 represents the variation of directional stability St in the case where the rear fins are horizontal in zone ZA and vertical in zone ZB, and a second curve C4 represents the variation of directional stability where there are no rear fins. It is shown clearly that the directional stability of an air transport means in accordance with the invention is intrinsically excellent, and also very advantageous compared to a vehicle with no rear fins, all other aspects being equal. A reference centring (i.e. a position of the vehicle's centre of gravity) merged with the supersonic centre of pressure (curve C1 in zone ZB of FIG. 16) is associated with the positioning of the fins described above. An additional advantage of the invention is that it enables an air vehicle to be manufactured which is centred in its rear sector.

FIGS. 18-21 illustrate different flight phases of an ultra-rapid air vehicle according to the invention.

Figure 18:
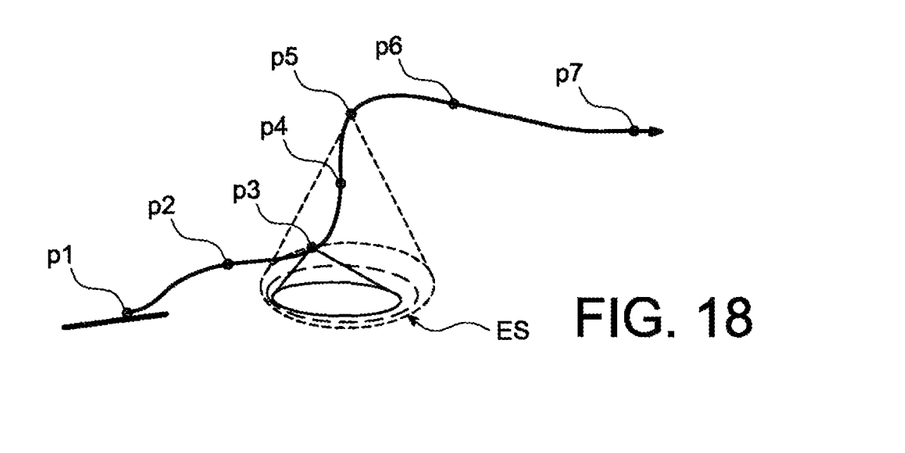
FIGS. 18-21 illustrate the different flight phases of an ultra-rapid air vehicle according to the invention.

FIG. 18 represents a first example of a departure phase of an air vehicle of the invention.

The vehicle accomplishes a conventional takeoff sequence, propelled by turbojets TB1, TB2, and assisted by rocket motor Mf. Rocket motor Mf can be a single rocket motor with continuously variable thrust, or a fractional-thrust rocket motor consisting, for example, of three or four different motors, one of which is a main motor. Firstly, the vehicle taxis from the parking point to the alignment point using only the turbojets (cf. point p1 in FIG. 18). The brakes are released only once a check has been made of the rocket motor's satisfactory operation.

Takeoff is accomplished with the turbojets/rocket motor configuration (cf. points p1 to p3 in FIG. 18), and the initial climbing speed of the air vehicle is of the order of 350 km/h (cf. points p1 to p2 in FIG. 18. After this (cf. point p3 in FIG. 18), either the main rocket motor is ignited (case of fractional motor), or the maximum power is deployed in the rocket motor (case of single rocket motor) and the air vehicle's ascension becomes near-vertical. Door P is made to open according to the different configurations required for satisfactory operation of the rocket motor (cf. FIGS. 14B, 14C described above). If the main rocket motor is not ignited, the cryogenic rocket propellant is consumed during a level holding flight, and a return to the departure installations can be undertaken with almost no propellant on board, which significantly contributes to the safety of a landing in a situation of an aborted mission. During the vehicle's ascent it produces a noise footprint ES the size of which varies over time, and which is of limited duration. After the main rocket motor is ignited or a maximum thrust is applied to the variable-thrust rocket motor, a high-thrust ascension phase commences. Slightly before entering transonic flight the turbojets are shut down and brought inside the fuselage. A thrust-to-weight ratio of roughly equal to or greater than 1 is established. During this flight phase the vehicle ascends at a steep gradient (i.e. near vertical), with a high-altitude (for example, between 15000 m and 20000 m) transonic acceleration, by means of the rocket motor (cf. point p4 in FIG. 18). If the rocket motor has variable thrust precise control of acceleration can advantageously be accomplished.

This type of trajectory significantly helps to reduce the effects on the ground of the supersonic boom, which is produced when the sound barrier is broken (Mach 1). Indeed, bearing in mind the near-vertical trajectory, no shockwave encounters the ground, and the energy is dissipated in all horizontal radial directions. On the ground, vertically underneath the accelerating vehicle, noise footprint ES produced is confined to the vicinity of the airport and lasts for roughly less than one minute.

During the takeoff phase, in a particular embodiment of the invention, the passengers and, possibly, the crew are placed in hammocks for improved comfort.

When the vehicle has reached supersonic speed at very high altitude (cf. point p5 in FIG. 18) the trajectory is gradually curved until it becomes horizontal, for example using a ballistic trajectory, and, when the rocket motor has been shut down and been made streamlined by complete closure of door P, and when the ramjets have been ignited, the vehicle enters its cruising flight corridor, for example at an altitude of between 30000 m and 35000 m (cf. point p6 in FIG. 18). The cruising flight phase has commenced (cf. point p7 in FIG. 18).

Figure 19:
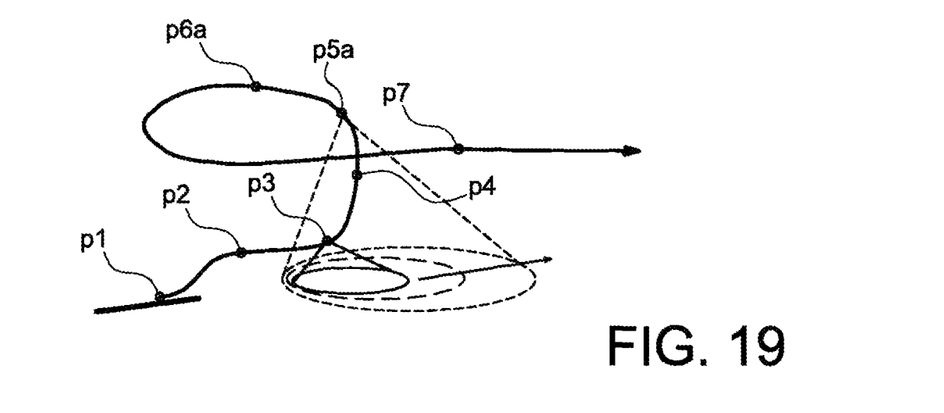

FIG. 19 represents a variant of the takeoff phase of the air vehicle of the invention. According to this variant the air vehicle accomplishes a loop, in a horizontal plane relative to the ground, before flying in the direction of its destination. The aim of this variant is to reduce the noise in the airport zone by moving the noise footprint far from the airport. In fact, above the vertical ascension phase, the trajectory of the vehicle is curved until it becomes horizontal by turning back towards the airport (cf. point p5a in FIG. 19) and the air vehicle enters into the cruising flight corridor at a point closer to the airport than in the previous case (cf. point p6a in FIG. 19).

Figure 20:
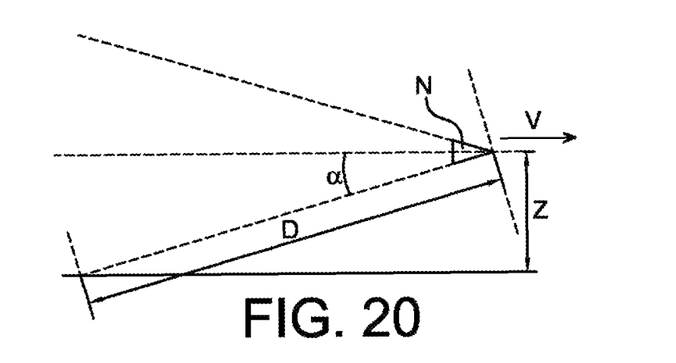

FIG. 20 symbolically illustrates the air vehicle of the invention in the cruising flight corridor. For reasons of simplicity only nose N of the vehicle of the invention is represented.

In the cruising flight corridor the flight parameters are, for example, as follows:
altitude Z of the aircraft relative to the ground roughly equal, for example, to 35000 m;

dissipation distance D roughly equal to 154 km;
speed V of the aircraft between Mach 4 and Mach 4.5; and
aperture angle α of the Mach cone roughly equal to 12.8°.

For comparison, in the case of the prior art, with the CONCORDE aircraft, the values of the above parameters are as follows:
Z=20000 m;
D=35 km;
V=Mach 2;
A=30°.

The ramjets are fixed-geometry devices, which greatly simplifies their geometrical complexity, and reduces their mass. During this flight phase the thrust of the ramjets is modified as required (lightening of the vehicle in the course of the flight, etc.) by varying the rate of supply of hydrogen. Advantageously, during the cruising flight, the vehicle causes very limited environmental impact due to the vehicle's very high cruising altitude and its constant heading. As required, geometrical solutions for reducing the supersonic bang, such as those presented in the HISAC 2009 conference (cf. shape design by Sukhoy and Dassault) can be incorporated into the design of the air vehicle, such as, for example, a pronounced wing surface dihedral.

Concerning the gases emitted by the vehicle during the acceleration and cruise phases, advantageously no $CO_2$ is emitted, but only water vapour and, possibly, gaseous hydrogen. During the cruising flight the electrical energy required for satisfactory operation of the vehicle (lighting, air-conditioning, etc.) is provided by any known means such as, for example, batteries, fuel cells, etc.

Figure 21:
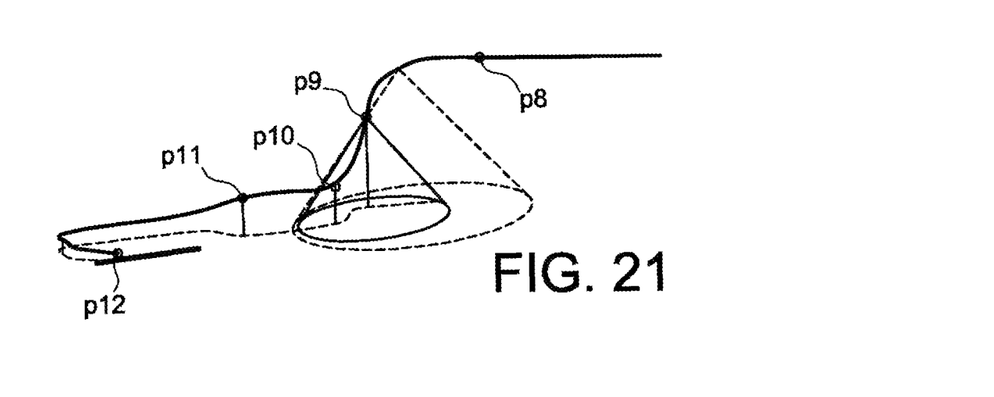

When approaching the destination airport a deceleration and descent phase commences. FIG. 21 represents an example deceleration and descent phase.

When in sight of the destination airport (for example some 750 km from the airport), the ramjets are shut down at a certain point of the vehicle's trajectory (cf. point p8 in FIG. 21). The vehicle then commences its deceleration. A gradual deployment of the split flaps then takes the vehicle into a descent at a steep gradient with a near-vertical speed during the transonic phase (cf. point p9 in FIG. 21). The steep-gradient descent is accomplished either at very high angle of attack, or at a near-zero angle of attack using the air brake. The supersonic boom, mentioned previously, is thus directed far from the terrestrial surface, and the sound waves are then almost horizontal. Once it is flying at subsonic speed, a resource is engaged and the air brakes are gradually closed (point p10 in FIG. 21). The turbojets are then deployed (cf. point p11 in FIG. 21) for restart, possibly assisted by relative wind, a technique known as windmilling. As required, the passengers and, possibly, the crew can be positioned in hammocks for improved comfort during this entire descent phase.

During the landing phase the air vehicle is inserted, at a given moment, in the existing air traffic, including, for example, to be placed in a holding pattern. The vehicle's final approach is then accomplished in standard fashion, i.e. at a vehicle speed comparable to that of traditional civil aircraft, making allowance for any go-around, if this proves necessary. Once landed the vehicle taxis until it comes to a stop solely under the effect of the thrust of the turbojets (point p12 in FIG. 21).

A preliminary estimate of the flight attitude on landing advantageously leads to lower values than for the CONCORDE aircraft.

The vehicle taxis using the turbojets, which give it a mobility similar to that of a traditional commercial aircraft.

During these phases the vehicle complies with the environmental regulations in force in civil aviation.

The turbojet or turbojets are used only during the phases of approach, holding, go-around and landing at the end of the flight. This use of the turbojets helps reduce their size and their mass substantially, compared to a standard use. The turbojet or turbojets of the air vehicle of the invention are consequently advantageously easy to retract inside the fuselage.

In a particularly advantageous manner, also, combined use of turbojets and of a rocket motor provides an excellent compromise in terms of thrust to mass ratio, combined with reduced drag during cruising, particularly in the approach and landing phases, during which the air vehicle is placed in the existing air traffic.

The invention claimed is:
1. An air vehicle including a fuselage (F), a gothic delta wing (A) distributed on either side of the fuselage, and a system of motors (TB1, TB2, ST1, ST2, Mf) able to propel the air vehicle, wherein:
the fuselage contains a tank (Rv) of hydrogen, wherein the hydrogen is liquid or in the state of slush, and one or more liquid oxygen tanks (RO1, RO2);
the gothic delta wing (A) has a flat upper surface and a flat lower surface, and a wing root which starts roughly in an area where a forward part of the fuselage broadens;
a fin (a1, a2) is attached to each outer end of the trailing edge of the delta wing using a cylindrical part the axis of which is parallel to a longitudinal axis of the fuselage, where each fin consists of two roughly identical trapezoid-shaped elements attached to the cylindrical part and located in the same plane, on either side of the cylindrical part, wherein each cylindrical part is able to rotate around its axis such that both trapezoid-shaped elements which are attached to the cylindrical part are positioned either in a plane parallel to the plane of the gothic delta wing, or in a plane perpendicular to the gothic delta wing; and
the system of motors includes at least one turbojet (TB1, TB2) positioned in a forward portion of the fuselage and able to be retracted into the fuselage, at least one fixed-geometry ramjet (ST1, ST2), and one rocket motor (Mf) positioned within a rear part of the fuselage, wherein a door (D) located in the rear part of the fuselage is able to be opened or closed, respectively to expose the rocket motor to the exterior, or to isolate the rocket motor from the exterior.

2. The air vehicle according to claim 1, in which the fuselage (F) consists of a front segment or nose, which extends a cabin segment and has a section which gradually broadens from the cabin segment, and of a rear segment, which gradually narrows towards the rear of the air vehicle.

3. The air vehicle according to claim 1, in which the centre of mass of each liquid oxygen tank (RO1, RO2) is positioned, whether empty or full, close to the centre of mass of the air vehicle.

4. The air vehicle according to claim 1, in which the rocket motor consists of a single motor or of a main motor accompanied by one or more auxiliary motors.

5. The air vehicle according to claim 1, in which the at least one fixed-geometry ramjet (ST1, ST2) comprises two ramjets that are located under the gothic delta wing, on either side of the fuselage.

6. The air vehicle according to claim 1, in which the vehicle has a leading edge sweep of roughly between 70° and 75°.

7. The air vehicle according to claim 1, in which the rocket motor (Mf) is a motor with continuously variable thrust or a fractional-thrust motor.

8. A method for aerial locomotion using the air vehicle in accordance with claim 1, wherein the method includes a phase of takeoff of the vehicle, wherein the takeoff phase includes the following steps:

- a step of taxiing of the vehicle on the ground, during which the vehicle is propelled by the at least one turbojet (TB1, TB2) to reach a point of alignment (p1), where both trapezoid-shaped elements of both fins (a1, a2) are positioned in a plane parallel to the gothic delta wing;
- a step of opening or of verification of a state of opening of the door (D) located at the rear of the vehicle; and
- a step of takeoff, during which the air vehicle is propelled simultaneously by the at least one turbojet (TB1, TB2), and by the rocket motor (Mf), wherein the vehicle is gradually brought into a phase of near-vertical ascending flight by a thrust deployed by the rocket motor (Mf), such that the vehicle reaches and exceeds MACH 1 speed during the ascending flight phase, wherein the at least one turbojet (TB1, TB2) is shut down and withdrawn into the fuselage (F) before the MACH 1 speed is reached, and wherein the positions of both trapezoid-shaped elements of both fins (a1, a2) of the air vehicle are gradually brought into a plane perpendicular to the plane of the gothic delta wing after the vehicle reaches and/or exceeds MACH 1 speed.

9. The method according to claim 8, further including a step during which the vehicle is gradually brought into a level flight, and in that, with the rocket motor shut down and made streamlined by complete closure of the door, and at least one ramjet ignited, the vehicle enters into a cruising flight phase after it reaches the level flight.

10. The method according to claim 9, wherein the vehicle accomplishes, in the level flight, a loop turning back towards a point of departure before entering into the cruising flight phase.

11. A method for aerial locomotion using the air vehicle in accordance with claim 1, wherein the method includes a phase of landing of the air vehicle from a cruising flight corridor in which the air vehicle is propelled by a thrust of the at least one fixed-geometry ramjet, wherein the positions of both trapezoid-shaped elements of both fins (a1, a2) are brought into a plane perpendicular to the gothic delta wing, wherein the air vehicle's landing phase includes the following steps:

- shutdown of the at least one fixed-geometry ramjet (ST1, ST2);
- the air vehicle comprising split flaps, gradual deployment of said split flaps which bring the air vehicle into a descent phase in a steep gradient with a reducing transonic near-vertical speed;
- modification of the position of both trapezoid-shaped elements of both fins (a1, a2) so as to position the said elements in a plane parallel to the plane of the gothic delta wing, after the speed of the air vehicle reaches and/or becomes less than MACH 1 speed;
- gradual closure of said split flaps and deployment of the at least one fixed-geometry ramjet, after the speed of the air vehicle becomes less than MACH 1; and
- insertion of the air vehicle into standard air traffic.

12. The method according to claim 11, in which the phase of descent with a steep gradient is accomplished either with an angle of attack, or with a near-zero angle of attack.

13. The method according to claim 9, in which the cruising flight is characterised by:

- an altitude of the aircraft relative to the ground of roughly between 30000 m and 35000 m;
- a dissipation distance of a shockwave of a nose of the air vehicle of roughly between 110 km and 175 km;
- a speed of the aircraft of between Mach 4 and Mach 4.5; and
- a aperture angle ($\alpha$) of a Mach cone of roughly between 11° and 15°.

* * * * *

UNITED STATES PATENT AND TRADEMARK OFFICE
CERTIFICATE OF CORRECTION

| | |
|---|---|
| PATENT NO. | : 9,079,661 B2 |
| APPLICATION NO. | : 13/516878 |
| DATED | : July 14, 2015 |
| INVENTOR(S) | : Prampolini |

It is certified that error appears in the above-identified patent and that said Letters Patent is hereby corrected as shown below:

In the specification, column 6, line 15, insert after "131=7900mm" and before "Figure 6"
-- 132=2650 mm.
In addition radius R1 is equal to 2797mm and angle θ4 is equal to 20° --

Signed and Sealed this
Twenty-second Day of December, 2015

Michelle K. Lee
*Director of the United States Patent and Trademark Office*